United States Patent [19]
Batcher et al.

[11] Patent Number: 4,722,219
[45] Date of Patent: Feb. 2, 1988

[54] METHOD AND APPARATUS FOR ZERO DRIFT COMPENSATION IN A LEAK DETECTOR USING A TRACE GAS DETECTOR CIRCUIT

[75] Inventors: Alfred J. Batcher, Clawson; Michael W. Boldys, East Detroit; Semyon Brayman, Southfield, all of Mich.

[73] Assignee: Antares, Inc., Madison Heights, Mich.

[21] Appl. No.: 924,812

[22] Filed: Oct. 30, 1986

[51] Int. Cl.$^4$ .............................................. G01M 3/04
[52] U.S. Cl. ...................................... 73/40.7; 73/1 G
[58] Field of Search ........................... 73/1 G, 23, 40.7

[56] References Cited

U.S. PATENT DOCUMENTS

| | | | |
|---|---|---|---|
| 3,495,437 | 2/1970 | Estes, III et al. | 73/1 G |
| 3,924,442 | 12/1975 | Kerho et al. | 73/23 |
| 4,223,549 | 9/1980 | Kitzinger | 73/1 G |
| 4,235,096 | 11/1980 | Yasuda et al. | 73/23 |
| 4,476,706 | 10/1984 | Hadden et al. | 73/1 G |
| 4,584,877 | 4/1986 | Brayman | 73/40.7 |

Primary Examiner—Stewart J. Levy
Assistant Examiner—Robert R. Raevis
Attorney, Agent, or Firm—John R. Benefiel

[57] ABSTRACT

A method and apparatus are disclosed for automatically compensating for the effects of variations in ambient trace gas levels or other causes of drift in trace gas leak detection testing, by generating a stored reference signal corresponding to the trace gas sensor output signal, freezing the reference signal at the beginning of each test and summing the output signal with the frozen reference signal to create a compensated output signal which is then compared with a preset threshold signal to trigger a reject during a given test. The uncompensated output signal is also continuously compared with a preset signal value and the test disabled if the output signal exceeds the preset signal at the beginning of each test.

6 Claims, 2 Drawing Figures

METHOD AND APPARATUS FOR ZERO DRIFT COMPENSATION IN A LEAK DETECTOR USING A TRACE GAS DETECTOR CIRCUIT

FIELD OF THE INVENTION

This invention concerns testing and more particularly leak testing using a trace gas detector to measure trace gas concentrations during successive tests conducted as is done on each of a number of items during production of manufactured items.

BACKGROUND DISCUSSION

It is sometimes necessary to test manufactured items for very minute leaks through portions of the item defining at least in part, a fluid tight cavity, such as the walls of fuel tanks and the rims of automotive wheels.

If such testing is done on every item, or a substantial proportion of the items produced, high volume production rate testing is necessary, with only a minimum test interval desirable. When testing for very minute leaks, achieving reliable detection in a short test interval is difficult.

A method heretofore employed is tract gas leak detection, in which the item is placed in a test fixture and a pressure differential applied across the portions of the item defining the fluid cavity, so that a trace gas containing fluid will be caused to pass through any leaks. Trace gas containing fluid passing through the item portion is collected, and passed over a trace gas detector of a type able to detect very minute concentrations of trace gas, with any increase in trace gas concentrations during the time the item is subjected to the differential pressure measured by the detector to detect leakage through the item portions. Examples of such method are disclosed in U.S. Pat. No. 4,584,877 and copending application Ser. No. 873,518 filed on May 23, 1986.

Typically, leaks must be of a predetermined magnitude in order to require failure of a tested item, so that the magnitude of detected levels of trace gas concentrations are relied on to measure the size of any leaks. Typically, the detected trace gas concentration levels are compared with a preselected threshold level corresponding to leakage of an unacceptable size.

Since many such tests are usually conducted successively over extended periods of time with the same apparatus, a problem has occurred in maintaining reasonably precise correlation between the detected trace gas concentration and the size of the leaks in the tested item.

This problem typically is caused by increases in the ambient levels of trace gas in the vicinity of the trace gas detector, as some trace gas escapes incidental to each test and causes a concentration increase in the air about the area of the test. Despite efforts to purge the test apparatus and shield the sensor from stray trace gas sources, this increase in ambient levels causes the trace gas sensor to read out an indication not only of increased trace gas concentration due to test item leakage, but the increase in ambient levels thereby creating error in the test results.

Another cause of such degradation of correlation of test results is drift in the electronic circuiting used to process the trace gas detector output signal. The phenomenon is herein referred to as the "zero drift".

Since the leak detection method depends on reasonably precise correlation between the detected concentration level of trace gas and the leak, accuracy of the test is compromised by such zero drift.

The time demands of production testing render impractical the calibration of equipment to zero prior to each test, and the skill level necessary for performance of the testing would be increased if such calibration were necessary.

Accordingly, it is the object of the present invention to provide a method and apparatus to automatically and reliably compensate for zero drift in a trace gas detector used for successive leak tests.

SUMMARY OF THE INVENTION

The present invention automatically compensates for test-to-test zero drift of a trace gas detector used in successive leak tests, by a circuit which maintains a reference signal in memory of a signal value corresponding to the output signal of the detector. At the beginning of each test interval, the reference signal is frozen in memory and used as a zero reference in a threshold level summing amplifier which also directly receives the detector output signal.

During the leak test, the trace gas detector output signal is compared with the reference signal value in memory at the beginning of each test cycle, so that any drift in the "zero level" i.e., the level of the detector output signal in the absence of a leak, is automatically compensated for to obtain a zero drift compensated detector signal.

The circuit according to the present invention compares the compensated output signal to the detector output signal at the moment of the test, so that when the compensated signal reaches a present threshold value, a "reject" indication is triggered.

The circuit also continuously compares the uncompensated detector output signal to a preset value, and generates a "test fault" output whenever the uncompensated signal exceeds a preset level, to abort further testing, as when ambient concentrations of trace gas reach excessive levels likely to interfere with reliability of the test results.

DETAILED DESCRIPTION

Figure 1:
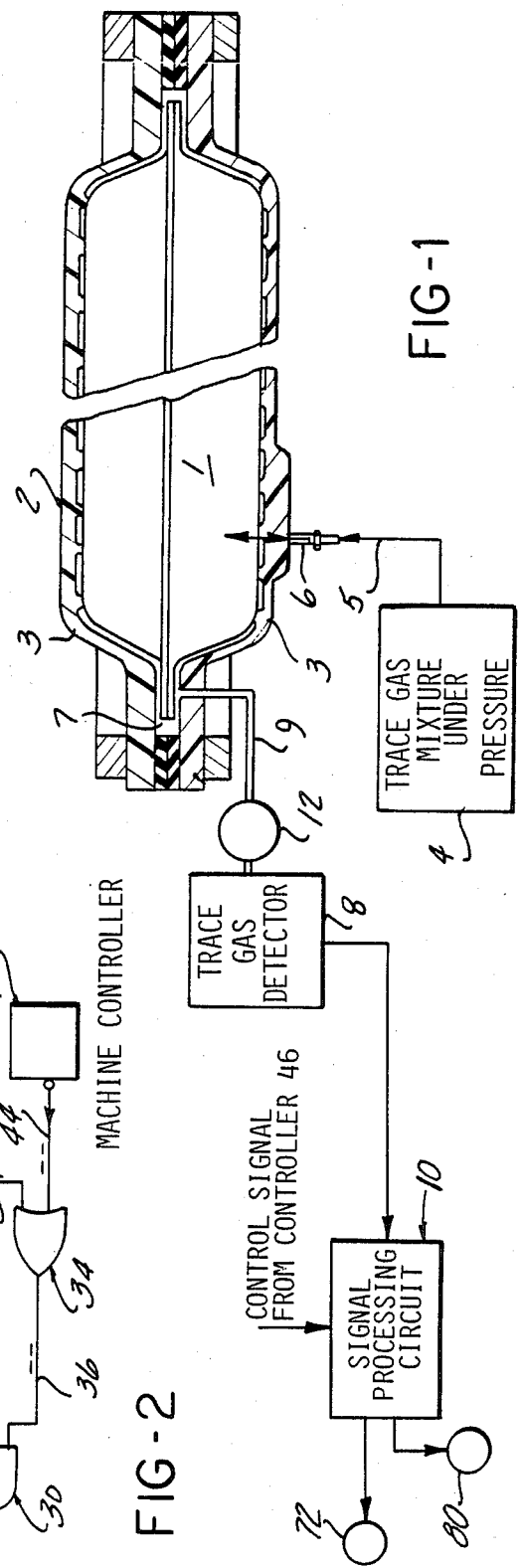
FIG. 1 is a simplified diagrammatic representation of a trace gas leak detector apparatus with which the present invention is employed.

FIG. 1 illustrates a typical leak test apparatus of the type with which the present invention is utilized, as described in further detail in the abovereferenced patent and patent application.

This includes a fixture 2 adapted to receive a test item 1, here illustrated as an automobile fuel tank, with upper and lower bowl shaped housing halves 3 configured to enclose the fuel tank 1 with a clearance space therebetween when the housing halves 3 are brought together.

A hermetically sealed chamber 7 is established in the clearance space by sealing the housing halves 3 tegether.

A mixture containing trace gas is supplied via line 5 from a source of gas mixture 4 and connected as detailed in U.S. Pat. No. 4,584,877 so as to pressurize the interior cavity of fuel tank 1.

The clearance space 7 is evacuated as by a vacuum pump 12 connected so as to create a pressure differential tending to induce flow out of the interior cavity of fuel tank 1 through the portion of the fuel tank defining the cavity into the clearance space 7, and thence out through line 9. If any leakage does occur, a trace gas detector 8 is arranged to receive the outlfow from the clearance space 7 and thereby sense the trace gas in the mixture escaping through any leaks.

Another trace gas leak testing arrangement is shown in Ser. No. 873,518 referenced above, for testing of wheel rims.

Figure 2:
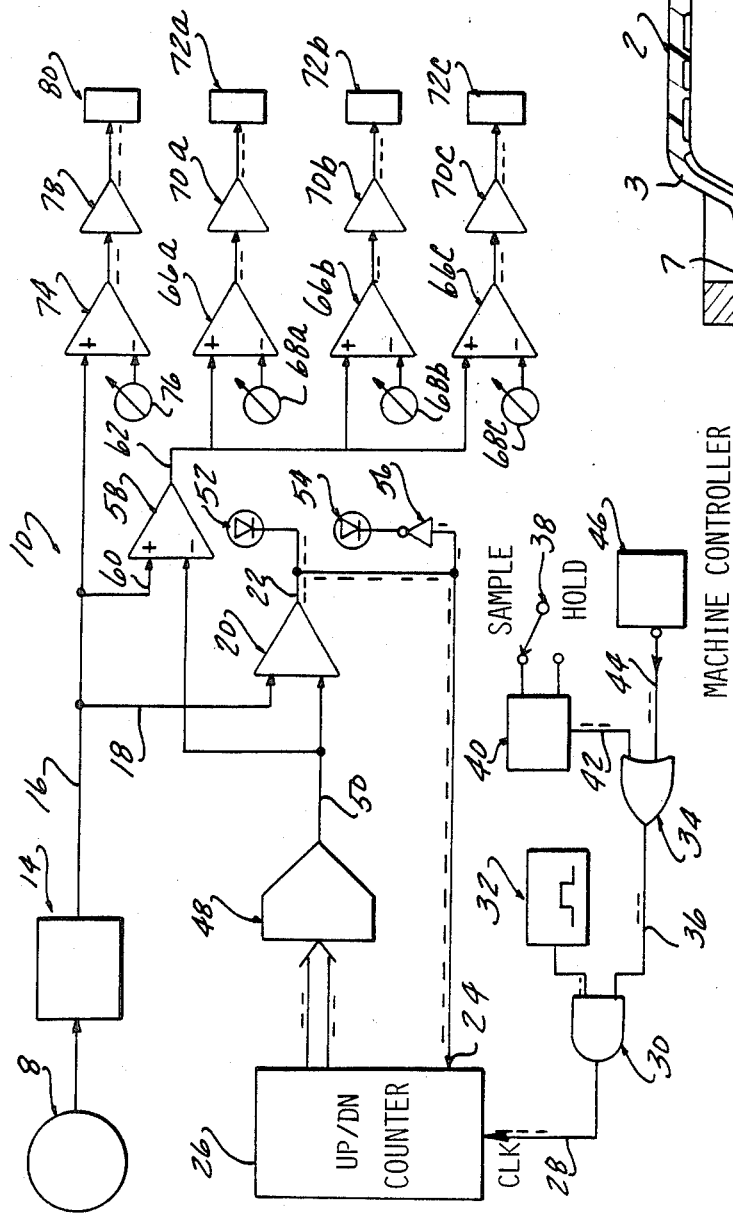
FIG. 2 is a block diagram of the compensation circuit according to the present invention.

Referring to the FIG. 2, the circuit 10 according to the present invention is adapted to process analog electrical signals received from a detector 8, which for comercially available trace gas detectors, may typically range up to 10 V dc output.

The detector output signals are passed through an inverter/limiter 14, as shown to prevent malfunctioning of an up/down counter to be described included in the circuit 10.

The detector output signal is transmitted to output line 16 of the limiter-inverter 14.

Branch line 18 causes the signal to be applied to one input of a count control comparator 20.

The output 22 of count control comparator 20 is connected to an up/down count control terminal 24 of a 12-bit up/down counter 26.

Up/down counter 26 counts clock pulses received over line 28 from the output of an AND gate 30.

AND gate 30 has one input connected to a clock pulse source 32, and the other input to the output of an OR gate 34 received over line 36.

OR gate 34 has one input connected to a manual switch 38 via a "debounce circuit" 40 such as a flip-flop, and line 42.

A manual switch 38 is provided to enable selective testing of the circuit 10, which normally is operated by signals from an overall control system for the testing apparatus designated as a machine controller 46.

Manual switch 38 has two positions. The first is the "hold" position in which no output is received by OR gate 34. The second, "sample" position applies a signal to OR gate 34, while the other input of OR gate 34 is connected to line 44 to receive an external signal from the machine controller 46.

Thus, if either manual switch 38 or machine controller 46 apply a signal to OR gate 34, a signal is applied to AND gate 30, and clock pulses from source 32 are gated into the up/down counter 26, and which are counted up or down depending on the signal received from comparator 20.

The machine controller 46 will normally apply a signal to OR gate, except during a leak test allowing clock pulses to be counted into counter 26. At the time of a leak test, OR gate 34 will no longer produce a signal, and gating of clock pulses from source 32 into counter 26 will be discontinued.

The parallel count in the up/down counter 26 is continuously read out into a 12 bit D/A converter 48 to convert the count to a corresponding analog signal on output 50, applied to the other input of comparator 20.

Thus, if the output signal from detector 8 is higher than the analog signal corresponding to the count in the up/down counter 26, an output 22 causes a count-up of pulses, and if lower, a count-down of pulses received on line 28 to equalize these signals. A count-down LED 52 and count-up LED 54 connected via inverter 56 may provide a visual indication of the direction of counting into counter 26.

Accordingly, memory means are provided to continuously maintain a reference signal on line 50 corresponding to the output signals of detector 8.

When the manual switch is in the hold condition, and the system controller 46 does not send a "hold" signal, to OR gate 34 clock pulses are no longer transmitted to the up/down counter 26, which freezes or fixes the reference signal on line 50 out of D/A converter 48. This fixing of the reference signal is normally done during the time a leak measurement is made.

During the time when switch 38 is in the "sample" position, or the machine controller 46 is applying a signal on line 44, as will occur at all other times line 50 will be equal in magnitude. The output reference signal on line 50 is connected to the substracting input of a summing amplifier 58 with the detector output signal applied to the adding input 60.

The output of summing amplifier 58 is the input on line 60 minus the input on line 50 and if one is the inversion of the other, the output on line 62 will be equal to zero. Thus, a compensated signal is generated at the output 62 with any zero drift occurring from test-to-test automatically offsetting the output 62.

The compensated signal is applied via line 62 to one input of one or more comparators 66a, 66b, or 66c, the other input of each being a predetermined constant voltage from adjustable potentiometers 68a, 68b, or 68c respectively.

Each reference signal may correspond to a calibrated threshold value selected for a particular item. For example, for different size fuel tanks or wheel rims, different leak rates may be acceptable.

If the compensated signal exceeds these predetermined threshold levels, the output of comparators 68a, 66b or 66c connected via power transistors 70a, 70b, 70c, respectively, trigger a suitable indicator or other system component 72a, 72b, 72c respectively to produce a "reject" of the tested part.

Circuit 10 also includes a comparator 74 having an input receiving the uncompensated detector output signal, and also a fixed reference signal from adjustable potentiometer 76.

If the uncompensated detector signal exceeds the preset reference signal, as reflecting an unacceptably high concentration of trace gas prior to start of the test, the output of comparator 74 transmitted via power transistors 78 causes triggering of an "abort" indicator or test disable system component 80.

Accordingly, it can be appreciated that a simple but reliable apparatus and method have been provided to affect the effects of drift in the "zero" or initial detector signal value prior to the conduct of the test, to thereby enable a practical production application of trace gas leak detection methods.

We claim:
1. In a leak detection system for detecting leaks from a cavity in each of a number of items to be successively tested, said system of the type comprising:
 fixture means for successively enclosing each of said number of items so as to form a hermetically sealed chamber defined in part by said enclosed item;
 means for applying a pressurized gas comprised at least in part of a trace gas to said enclosed item;
 means for creating a pressure differential across said enclosed item tending to produce a flow of said pressurized trace gas between said chamber and said enclosed item cavity through any openings in said enclosed item;

trace gas detector means located adjacent said fixture means for directing at least part of any trace gas flow between said chamber and said item cavity for generating an electrical output signal of a magnitude corresponding to the concentration level of said trace gas in the vicinity of said trace gas detector, the improvement comprising a trace gas detector signal processing circuit associated with said trace gas detector to receive said trace gas detector output signal, said trace gas signal processing circuit including;

memory means for continuously receiving said output signal from said trace gas detector and generating a stored reference signal continuously changing as necessary to correspond to said trace gas detector output signal over a time interval;

control means for fixing said reference signal at the value existing when a leak test is initiated of a particular one of said number of items successively tested;

compensation means receiving said trace gas detector output signal and said fixed reference signal and generating a compensated output signal comprised of the difference therebetween;

comparator means receiving said compensated output signal and comparing said compensated output signal with a predetermined threshold value; and indicator means responsive to said comparator means to trigger a rejection signal as to a particular one of said number of items being tested whenever said compensated output signal exceeds said threshold value for an item tested, whereby changes in the concentration of trace gas in the vicinity of said fixture and said trace detector over a period of time during which said tests are conducted are compensated for in detecting the magnitudes of any leak in a given tested item.

2. The system according to claim 1 wherein said memory means includes an up/down counter and a source of clock pulses connected to said up/down counter to enable count up or count down, and means gating said clock pulses up or down into said up/down counter so as to produce correspondence between said trace gas detector output signal and the count in said up/down counter.

3. The system according to claim 1 wherein said signal processing circuit further includes another comparator means receiving said trace gas detector signal and comparing said trace gas detector output signal with a predetermined set value, and also including another indicator means disabling a leak test of an enclosed item whenever said trace gas detector output signal exceeds said predetermined preset value prior to the beginning of each leak test of a particular one of said number of items, whereby testing is disabled whenever the trace gas concentration in the vicinity of said fixture and said trace gas detector exceed said predetermined threshold value.

4. The system according to claim 1 further including a plurality of said comparator means, each having a differing preset value corresponding to reject levels of a differing item configuration.

5. A method of compensating for drift in ambient levels of trace gas during a test period during which a number of successive tests are conducted at spaced time intervals in said test period, each test involving sensing of increased trace gas concentrations to detect a specific condition tested for, with a trace gas detector generating an electrical output signal corresponding to the concentration level of trace gas, the method comprising the steps of:

generating a stored reference signal continuously changed as necessary to correspond to said trace gas detector output signal during time intervals between said successive tests;

fixing said reference signal at the beginning of each test at the signal value existing at the beginning of said test;

offsetting the value of said output signal during said test with the value of said reference signal when fixed to compensate said output signal by the value of said fixed value of said reference signal;

comparing said compensated output signal with a preset constant threshold signal; and triggering an indication whenever said compensated output signal value exceeds said threshold signal, whereby drift in the zero of said output signal between tests is compensated for.

6. The method according to claim 5 further including the step of continuously comparing said uncompensated output signal with a preset constant signal value, and aborting said test whenever said output signal exceeds said preset constant signal value at the beginning of a given test.

* * * * *

UNITED STATES PATENT AND TRADEMARK OFFICE
CERTIFICATE OF CORRECTION

PATENT NO.   : 4,722,219
DATED        : February 2, 1988
INVENTOR(S)  : Alfred J. Batcher et al It is certified that error appears in the above-identified patent and that said Letters Patent is hereby corrected as shown below:

Column 1, line 24, "tract" should be --trace--.

Column 2, line 64, "tegether" should be --together--.

Column 3, line 7, "outlfow" should be --outflow--.

Column 4, line 17, "substracting" should be --subtracting--.

Signed and Sealed this

Ninth Day of August, 1988

Attest:

DONALD J. QUIGG

*Attesting Officer*    *Commissioner of Patents and Trademarks*